United States Patent
Abraham et al.

(10) Patent No.: US 9,862,900 B2
(45) Date of Patent: Jan. 9, 2018

(54) DEVICE AND METHOD FOR INTRODUCING OXYGEN INTO A PRESSURIZED FLUIDIZED-BED GASIFICATION PROCESS

(71) Applicant: THYSSENKRUPP INDUSTRIAL SOLUTIONS AG, Essen (DE)

(72) Inventors: Ralf Abraham, Bergkamen (DE); Domenico Pavone, Bochum (DE); Reinald Schulze Eckel, Münster (DE); Dobrin Toporov, Dortmund (DE); Simon Boris Hafner, Dortmund (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 38 days.

(21) Appl. No.: 14/421,793

(22) PCT Filed: Aug. 8, 2013

(86) PCT No.: PCT/EP2013/002369
§ 371 (c)(1),
(2) Date: Feb. 13, 2015

(87) PCT Pub. No.: WO2014/026748
PCT Pub. Date: Feb. 20, 2014

(65) Prior Publication Data
US 2015/0232770 A1    Aug. 20, 2015

(30) Foreign Application Priority Data
Aug. 14, 2012    (DE) .................... 10 2012 016 086

(51) Int. Cl.
C10J 3/54    (2006.01)
C10J 3/78    (2006.01)
(Continued)

(52) U.S. Cl.
CPC .    *C10J 3/54* (2013.01); *C10J 3/56* (2013.01); *C10J 3/78* (2013.01); *C21C 5/4606* (2013.01);
(Continued)

(58) Field of Classification Search
None
See application file for complete search history.

(56) References Cited

U.S. PATENT DOCUMENTS 2,340,899 A * 2/1944 Ray .................... H01L 35/00
136/212
2,430,887 A * 11/1947 Ray .................... F23Q 9/04
136/217
(Continued)

FOREIGN PATENT DOCUMENTS

CN    2801784 Y    8/2006
DE    3439404 C2    10/1986
(Continued)

OTHER PUBLICATIONS

German Language International Search Report for International patent application No. PCT/EP2013/002369; dated Oct. 24, 2013.
(Continued)

*Primary Examiner* — Kaity Chandler
(74) *Attorney, Agent, or Firm* — thyssenkrupp North America, Inc.

(57) ABSTRACT

The invention relates to an oxygen lance that has at least three mutually coaxial pipes, each of which delimits at least one annular gap. The outermost pipe is designed to conduct superheated steam and has a steam supply point, the central pipe is designed as an annular gap, and the innermost pipe is designed to conduct oxygen at a temperature of no higher than 180° C. and has an oxygen supply point. A temperature sensor is arranged within the innermost pipe, said temperature sensor extending to just in front of the opening of the
(Continued)

innermost pipe. The innermost pipe tapers in the form of a nozzle before opening; the innermost pipe opens into the central pipe; and the opening of the central pipe protrudes farther relative to the opening of the outermost pipe.

18 Claims, 2 Drawing Sheets

(51) Int. Cl.
  *C10J 3/56* (2006.01)
  *C21C 5/46* (2006.01)
(52) U.S. Cl.
  CPC .............. *C10J 2300/0959* (2013.01); *C10J 2300/1846* (2013.01)

(56) References Cited

U.S. PATENT DOCUMENTS

| | | | | |
|---|---|---|---|---|
| 3,043,577 A * | 7/1962 | Berry | ........... | C21O 5/4606 239/132.3 |
| 3,680,785 A * | 8/1972 | Miller | ........... | F23D 14/22 239/132.3 |
| 3,689,041 A * | 9/1972 | Pere | ........... | C21D 9/70 432/12 |
| 3,730,928 A * | 5/1973 | Stone | ........... | C05F 36/04 523/303 |
| 3,982,910 A * | 9/1976 | Houseman | ........... | C01B 3/22 123/3 |
| 4,010,935 A * | 3/1977 | Stephens | ........... | C22B 21/0092 266/141 |
| 4,014,654 A * | 3/1977 | Howell | ........... | C09C 1/50 239/428 |
| 4,157,889 A * | 6/1979 | Bonnel | ........... | F23D 17/007 110/263 |
| 4,249,722 A * | 2/1981 | Jaquay | ........... | C22B 1/10 266/172 |
| 4,249,907 A * | 2/1981 | Callejas | ........... | B01J 8/001 422/62 |
| 4,336,049 A * | 6/1982 | Takahashi | ........... | C03B 37/01413 65/390 |
| 4,491,456 A | 1/1985 | Schlinger | | |
| 4,525,176 A * | 6/1985 | Koog | ........... | B01J 19/0026 134/5 |
| 4,591,331 A * | 5/1986 | Moore | ........... | F23D 1/00 110/189 |
| 4,710,607 A * | 12/1987 | Wilhelmi | ........... | C04B 35/52 219/119 |
| 4,740,217 A | 4/1988 | Lambertz | | |
| 4,887,800 A * | 12/1989 | Hotta | ........... | C21B 5/003 110/263 |
| 5,233,156 A * | 8/1993 | Chan | ........... | H05H 1/42 219/121.5 |
| 5,261,602 A * | 11/1993 | Brent | ........... | C01B 3/363 110/347 |
| 5,273,212 A * | 12/1993 | Gerhardus | ........... | C01B 3/363 239/132.3 |
| 5,281,243 A * | 1/1994 | Leininger | ........... | F23D 1/005 431/12 |
| 5,498,277 A | 3/1996 | Floyd | | |
| 5,611,683 A * | 3/1997 | Baukal, Jr. | ........... | F23D 14/22 239/422 |
| 5,714,113 A * | 2/1998 | Gitman | ........... | C21B 5/003 266/182 |
| 5,957,678 A * | 9/1999 | Endoh | ........... | F23G 7/065 431/187 |
| 6,019,595 A * | 2/2000 | Wulfert | ........... | F23D 14/22 239/422 |
| 2003/0223926 A1* | 12/2003 | Edlund | ........... | B01J 8/0221 422/198 |
| 2004/0063054 A1* | 4/2004 | Cain | ........... | F23N 5/242 431/12 |
| 2004/0172877 A1* | 9/2004 | Wunning | ........... | B01B 1/005 48/102 A |
| 2005/0040571 A1 | 2/2005 | Matthias | | |
| 2010/0126067 A1* | 5/2010 | Koyama | ........... | C10J 3/506 48/77 |
| 2011/0044868 A1* | 2/2011 | Lee | ........... | C01B 3/384 422/626 |
| 2011/0151386 A1* | 6/2011 | Marcano | ........... | F23D 1/00 431/8 |
| 2013/0323656 A1* | 12/2013 | Wieck | ........... | F23D 14/22 431/8 |

FOREIGN PATENT DOCUMENTS

| | | |
|---|---|---|
| DE | 4407651 C1 | 10/1995 |
| EP | 2476956 A2 | 7/2012 |
| GB | 820820 * | 9/1959 |
| GB | 1001032 A | 8/1965 |
| RU | 2106413 C | 3/1998 |
| RU | 2301837 C | 6/2005 |
| WO | 01/75367 A1 | 10/2001 |
| WO | 2010/006723 A2 | 1/2010 |

OTHER PUBLICATIONS

English Translation of International Search Report for International patent application No. PCT/EP2013/002369; dated Oct. 24, 2013.
English translation of the abstract for DE 3439404 (C2).
English translation of the abstract for DE 4407651 (C1).
English language Abstract of CN 2801784 Y listed above.

* cited by examiner

DEVICE AND METHOD FOR INTRODUCING OXYGEN INTO A PRESSURIZED FLUIDIZED-BED GASIFICATION PROCESS

CROSS REFERENCE TO RELATED APPLICATIONS

This application is a U.S. National Stage Entry of International Patent Application Serial Number PCT/EP2013/002369, filed Aug. 8, 2013, which claims priority to German patent application no. DE 102012016086.0, filed Aug. 14, 2012.

FIELD

The invention relates to a method and a device for introducing oxygen into a pressurized fluidized bed gasification process which is typically employed in a gasification reactor according to the high-pressure Winkler method (HTW method).

BACKGROUND

The HTW method has been known for a long time and is tried-and-tested technology whereby both particulate and liquid or pasty carbon-containing fuels are converted into synthesis gas. The fuels used are also heavy fuels with a very high ash content and also biomass-based fuels and carbon-containing waste materials. These are introduced into a fluidized bed, which is operated as a bubbling fluidized bed, and are gasified by means of oxygen, steam and $CO_2$. In contrast to other gasification methods, the HTW method works at moderate temperatures at which the ash which occurs does not melt. This has operational benefits particularly in the case of corrosive ashes.

The addition of oxygen has to be metered very accurately, since excessive metering would lead to increased burn-out and therefore to an increase in the $CO_2$ content in the synthesis gas, which must be avoided. Also, excessive metering would lead, in the immediate surroundings of the oxygen inlet points, to a meltdown of the ash particles, with the result that caking with the fluidized bed material may occur and would lead in turn to material adhering to the oxygen lances. Accurate, quick and fine regulation of the oxygen feed is therefore necessary because the fuels are partly fed discontinuously under pressure. This leads to especially stringent requirements to be fulfilled by the oxygen lances which are typically used for introducing the required oxygen into the fluidized bed reactor.

Corresponding oxygen lances are described, for example, in DE 34 39 404 C2 and DE 44 07 651 C1 which correspond to the hitherto existing prior art. In these, the problem of possible caking is solved in that, at the point of exit of the oxygen, steam addition is arranged in such a way as to form a steam film which envelops the emerging oxygen jet. The turbulences generated at the same time in the emerging gas jet have a very high steam content which prevents overheating of the entrained fluidized bed particles and thus considerably reduces the tendency to caking.

However, this technology presents problems at pressures above 8 to 10 bar. Before being added to the oxygen lance, the oxygen is usually preheated. For safety reasons, however, it would be preferable not to carry out heating above 180° C., since in this case equipment parts, in particular seals, which are customary in the industry are attacked. Above 200° C., there are statutory licensing restrictions in the use of material. If the preheated oxygen is introduced into the oxygen lance at 180° C. and if superheated steam is applied in an enveloping pipe, condensates are formed at a pressure of above 8 to 10 bar on the steam side of the oxygen-carrying pipe. These condensates change the flow conditions of the gas outlet to such a great extent that an enveloping steam film is no longer formed around the oxygen lance. This leads to the failure of the oxygen lances.

SUMMARY

The object of the invention is, therefore, to make available a device and a method for introducing oxygen into a pressurized fluidized bed gasification process which is also suitable for operating pressures of above 10 bar and, along with high safety and availability, is efficient.

BRIEF DESCRIPTION OF THE DRAWINGS

The present disclosure is described in detail below with reference to the attached drawing figure, wherein.

DETAILED DESCRIPTION

Figure 1:
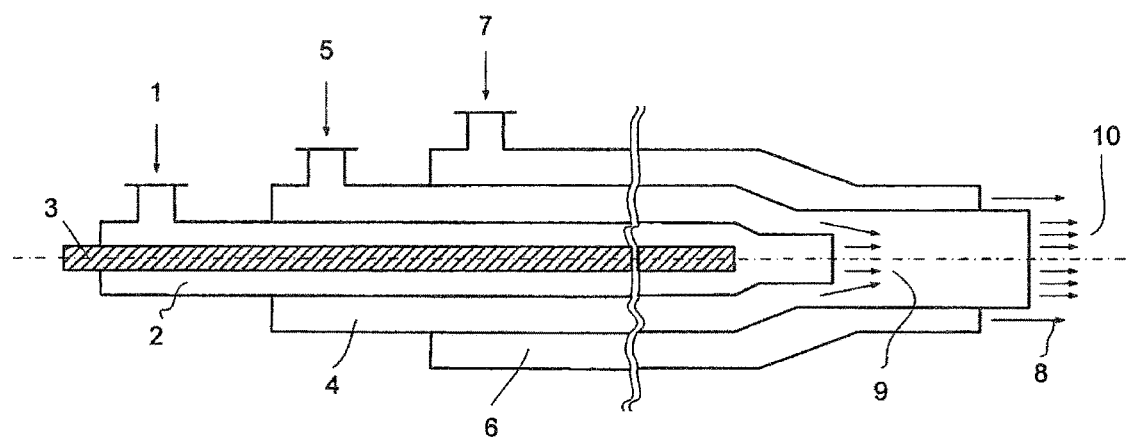
FIG. 1 is a side cross section view of an embodiment of an oxygen lance of the present disclosure, the mouth of which is configured to be directed into the fluidized bed of a HTW gasification reactor.

Disclosed herein is an oxygen lance having at least three pipes arranged coaxially, one at least partially disposed within in the other, and at least in each case delimiting an annular gap, wherein:

the outermost pipe being designed for the conduction of superheated steam and having a steam feed point, the middle pipe being designed as an annular gap, the innermost pipe being designed for the conduction of oxygen with a temperature of at most 180° C. and having an oxygen feed point, there being arranged inside the innermost pipe a temperature probe which reaches to just short of the mouth of the innermost pipe, the innermost pipe tapering in a nozzle-like manner upstream of its mouth, the innermost pipe issuing into the middle pipe, and the mouth of the middle pipe projecting further in relation to the mouth of the outermost pipe.

In one refinement, the middle pipe may be designed as a blind pipe closed on both sides, and in this case the term "mouth" used in the preceding paragraph is intended in this limiting instance to refer merely to the pipe end in the vicinity of the mouth of the outermost pipe. In another refinement, the middle pipe is open on the mouth side of the oxygen lance. In a further refinement, the middle pipe is designed for the conduction of dry gas and has a gas introduction point. In this case, in a further refinement, there may be provision whereby the middle pipe tapers in a nozzle-like manner upstream of the mouth of the innermost pipe issuing into the middle pipe.

Dry gas is understood here, as is customary in combustion technology in contrast to steam generation technology, to mean an industrial gas without steam fractions. By contrast, moist gas is understood below to mean an industrial gas which also contains steam fractions, although this is not intended to mean that a multiphase mixture has been formed.

Superheated steam is therefore to be considered as moist gas, even though it is dry in the sense that wet steam has not occurred.

The object is also achieved, as described above, by means of a method for introducing oxygen into a fluidized bed gasification reactor, operated according to the HTW method, by means of an oxygen lance, moist gas being fed into the outermost pipe at a pressure above the pressure in the fluidized bed gasification reactor, oxygen being conducted into the innermost pipe at a temperature of at most 180° C. and with a pressure above the pressure in the fluidized bed gasification reactor, moist gas emerging from the mouth of the outermost pipe as a cladding flow around the mouth of the middle pipe and the emerging free jet, the flow velocity of the emerging moist gas being set higher than that of the emerging gas from the innermost pipe.

In refinements of the method, there may be provision whereby dry gas is introduced into the middle pipe at a pressure above the pressure in the fluidized bed gasification reactor, and thereby oxygen and dry gas are intermixed upstream of the mouth of the middle pipe.

In further refinements of the method, there is provision whereby the moist gas is superheated steam or a mixture of carbon dioxide and of superheated steam.

In further refinements of the method, there is provision whereby the dry gas is carbon dioxide, nitrogen or a mixture of carbon dioxide and of air or a mixture of carbon dioxide and of nitrogen. Moreover, insofar as is desirable in the gasification process, operation without dry gas is possible, the positive effects upon the temperature of the moist gas being maintained. The minimum feed temperature of the dry gas into the middle pipe arises from the dew point of the moist gas used in the outermost pipe, this corresponding in the case of pure steam to the saturated steam temperature.

It became apparent that this technical solution is especially beneficial economically, since the supply lines for carbon dioxide can be used due to the need to ensure inertization of the oxygen lances during rapid shutdowns, and the insertion of a further pipe into the oxygen lances entails only little outlay. The choice of a dry gas with high specific heat capacity and the additional shielding of the hot moist gas against the cooler oxygen prevent an appreciable lowering of temperature in the steam-carrying outermost pipe and therefore the condensation of steam in the outermost pipe.

The invention is explained in more detail below by means of 2 sketches.

Figure 2:
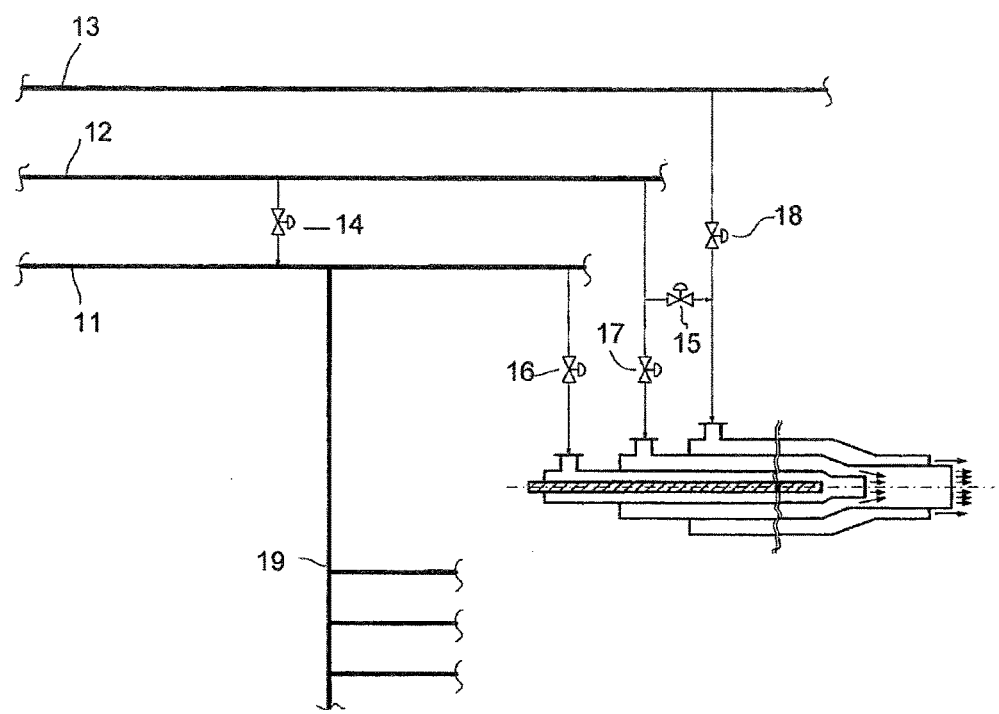
FIG. 2 is a schematic diagram depicting an embodiment of a layout for the supply lines for each of oxygen, carbon dioxide, and steam to be fed into an oxygen lance of the present disclosure.

FIG. 1 in this case shows diagrammatically a section through an oxygen lance, the mouth of which issues into the fluidized bed of an HTW gasification reactor, not shown, and FIG. 2 shows the circuitry of the supply lines for oxygen, carbon dioxide and steam.

Oxygen 1 is conducted into the innermost pipe 2 in which the temperature measuring device 3 is arranged. The temperature amounts to 180 degrees Celsius and the pressure at the inlet to approximately 28 bar. The exact pressure is determined by means of the quantity control which feeds the reactor with exactly the quantity of oxygen just required instantaneously for gasification. Carbon dioxide 5 at 230 degrees Celsius is added to the middle pipe 4. Superheated steam 7 with a pressure of approximately 29 bar and a temperature of 410 degrees Celsius is introduced into the outermost pipe 6. This steam heats the carbon dioxide to a temperature of approximately 270 degrees Celsius, the oxygen likewise being heated slightly. Since the dew point of the steam is not in this case undershot, steam is not condensed out and no droplets are formed at the mouth 8 of the outermost pipe, so that a homogenous steam film can be formed around the tip of the oxygen lance.

The oxygen of the innermost pipe and the carbon dioxide of the middle pipe are brought together at the mixing point 9 into a common gas stream, the feed point already lying inside the fluidized bed in the HTW gasification reactor. The mixture is conducted as a free jet 10 into the fluidized bed, the steam film preventing the oxygen from forming vortices around the nozzle tip and thus preventing possible local overheating with the result of ash softening and caking at the nozzle tip. The fluidized bed reactor can thereby be operated at a pressure of 28 bar.

FIG. 2 shows a circuit diagram with supply lines for oxygen 11, carbon dioxide 12 and superheated steam 13 and also with the most important shut-off and regulating valves. In an emergency, carbon dioxide can be introduced into the oxygen line via the scavenging valve 14 and into the steam line via the regulating valve 15. As a rule, the two valves are closed. As a function of the oxygen quantity required, the regulating valve 16 serves for the oxygen supply, regulating valve 17 serves for regulating the quantity of carbon dioxide and the regulating valve 18 serves for the introduction of steam. Oxygen 11 can also be distributed to other nozzle levels via the oxygen distributor 19.

The following computing and design examples illustrate the invention:

In example 1, the outermost pipe is subjected to steam and the middle pipe to nitrogen.

In example 2, the outermost pipe is subjected to steam and the middle pipe to carbon dioxide.

In example 3, the outermost pipe is subjected to a mixture which is composed in equal proportions by mass of carbon dioxide and of steam and the middle pipe is subjected to carbon dioxide.

In example 4, the outermost pipe is subjected to steam and the middle pipe is left without any throughflow.

In all the examples, the innermost pipe is subjected to oxygen, the inside diameter amounting to approximately 25 mm and a thermocouple with a thickness of 11 mm being arranged inside. All the indications of dimension are approximate indications obtained from design calculations.

|  | Example 1 | Example 2 | Example 3 | Example 4 |
|---|---|---|---|---|
| gap of the outermost pipe [mm] | 9 | 15 | 15 | 15 |
| gap of the middle pipe [mm] | 10 | 4 | 4 | 4 |
| mass throughflow through the outermost pipe [kg/s] | 0.039 | 0.039 | 0.039 | 0.039 |
| mass throughflow through the middle pipe [kg/s] | 0.0039 | 0.0039 | 0.0039 | — |
| mass throughflow through the innermost | 0.225 | 0.225 | 0.225 | 0.225 |

-continued

|  | Example 1 | Example 2 | Example 3 | Example 4 |
|---|---|---|---|---|
| pipe [kg/s] | | | | |
| inlet temperature into the outermost pipe [° C.] | 410 | 410 | 410 | 410 |
| inlet temperature into the middle pipe [° C.] | 230 | 230 | 230 | — |
| inlet temperature into the innermost pipe [° C.] | 180 | 180 | 180 | 180 |
| outlet temperature from the outermost pipe [° C.] | 400 | 390 | 390 | 390 |
| outlet temperature from the middle pipe [° C.] | 270 | 270 | 270 | — |
| outlet temperature from the innermost pipe [° C.] | 182 | 182 | 182 | 182 |

In all instances, the saturated steam temperature of the moist gas of the outermost pipe is at no point undershot in the middle pipe, and therefore condensation cannot occur.

The invention is not restricted to the examples illustrated, and, furthermore, it is also possible, in the case of different load situations or operating situations, to adapt the respective throughflows to the requirements in a flexible way.

LIST OF REFERENCE SYMBOLS 1 oxygen
2 innermost pipe
3 temperature measuring device
4 middle pipe
5 carbon dioxide
6 outermost pipe
7 steam
8 mouth of the outermost pipe
9 mixing point
10 free jet
11 oxygen
12 carbon dioxide
13 steam
14 scavenging valve
15 regulating valve
16 regulating valve
17 regulating valve
18 regulating valve
19 oxygen distributor

The invention claimed is:

1. An oxygen lance comprising:
an inner pipe including an inlet disposed at a proximal end thereof, a mouth disposed at a distal end thereof, and a tapered nozzle section disposed upstream of said mouth;
a middle pipe coaxially disposed around an outer surface of at least said distal end of said inner pipe and defining a middle annular gap between the outer surface of said inner pipe and an inner surface of said middle pipe, said middle pipe having a mouth disposed at a distal end thereof;
an outer pipe coaxially disposed around an outer surface of at least a portion of said middle pipe and defining an outer annular gap between the outer surface of said middle pipe and an inner surface of said outer pipe, said outer pipe having an inlet disposed at a proximal end thereof and a mouth disposed at a distal end of said outer pipe beyond which said mouth of said middle pipe extends, wherein the outer pipe extends distally beyond a location within the middle pipe where the mouth of the inner pipe terminates; and
a temperature probe disposed inside said inner pipe and having a distal end disposed upstream of said mouth of said inner pipe at said distal end thereof, wherein the temperature probe extends along a longitudinal axis of the inner pipe.

2. The oxygen lance of claim 1, wherein said mouth of said middle pipe is open.

3. The oxygen lance of claim 1, wherein said middle pipe includes a feed inlet and is configured to permit dry gas to flow through said middle pipe.

4. The oxygen lance of claim 3, wherein said middle pipe has a tapered nozzle section disposed upstream of said mouth of said inner pipe.

5. The oxygen lance of claim 1 wherein the inlet of the inner pipe is an inlet, wherein the inner pipe is configured to permit oxygen having a maximum temperature of 180° C. to flow there through from the inlet to the mouth, wherein the middle pipe is configured to permit oxygen to flow out of the mouth of the inner pipe and into the middle pipe, wherein the inlet of the outer pipe is a steam feed inlet, wherein the outer pipe is configured to permit superheated steam to flow through the outer pipe.

6. The oxygen lance of claim 1 wherein the temperature probe measures a temperature of a substance flowing through the inner pipe.

7. The oxygen lance of claim 1 wherein the middle pipe has a constant diameter at the location where the mount of the inner pipe terminates.

8. The oxygen lance of claim 1 further comprising a regulating valve disposed upstream of the inlet of the inner pipe for regulating an amount of gas or stopping gas from being fed into the inner pipe based on measurements from the temperature probe.

9. The oxygen lance of claim 1 wherein the mouth of the middle pipe that extends beyond the mouth of the outer pipe has a constant diameter.

10. A method for introducing oxygen into a fluidized bed gasification reactor operated according to the HTW method, comprising:
providing an oxygen lance according to claim 1;
feeding moist gas into the outer pipe at a pressure above a pressure in the fluidized bed gasification reactor;
feeding oxygen into the inner pipe at a temperature of up to 180° C. and a pressure above a pressure in the fluidized bed gasification reactor;
expelling the oxygen from the mouth of the inner pipe into the middle pipe;
expelling an emerging free jet of gas from the mouth of the middle pipe, the emerging free jet of gas including at least the oxygen expelled from the inner pipe into the middle pipe;

expelling moist gas from the mouth of the outer pipe as a cladding flow surrounding the mouth of the middle pipe and the associated emerging free jet of gas expelled therefrom, wherein a flow velocity of the emerging moist gas is higher than a flow velocity of oxygen expelled from the inner pipe.

11. The method of claim 10, further comprising:

feeding dry gas into the middle pipe;

mixing, in the middle pipe, the oxygen expelled from the inner pipe with the dry gas in the middle pipe, upstream of the mouth of the middle pipe, wherein said expelled emerging free jet of gas from said middle pipe is the mixed oxygen and dry gas; and expelling moist gas from the mouth of the outer pipe as a cladding flow surrounding the mouth of the middle pipe and the associated emerging free jet of gas expelled therefrom, wherein a flow velocity of the emerging moist gas is higher than a flow velocity of the mixed oxygen and dry gas expelled from the middle pipe.

12. The method of claim 10, wherein the moist gas is superheated steam.

13. The method of claim 10, wherein the moist gas is a mixture of carbon dioxide and superheated steam.

14. The method of claim 10, wherein the dry gas is carbon dioxide.

15. The method of claim 10, wherein the dry gas is nitrogen.

16. The method of claim 10, wherein the dry gas is a mixture of carbon dioxide and of air.

17. The method of claim 10, wherein the dry gas is a mixture of carbon dioxide and of nitrogen.

18. The method of claim 10, wherein the dry gas is not moved during operation.

\* \* \* \* \*